US010312707B2

(12) United States Patent
Dietzel et al.

(10) Patent No.: US 10,312,707 B2
(45) Date of Patent: Jun. 4, 2019

(54) HAND TOOL CASE HOLDING DEVICE

(71) Applicants: Friederike Dietzel, Stuttgart (DE); Juergen Mack, Goeppingen (DE); Marcin Rejman, Waiblingen (DE)

(72) Inventors: Friederike Dietzel, Stuttgart (DE); Juergen Mack, Goeppingen (DE); Marcin Rejman, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 14/359,546

(22) PCT Filed: Nov. 7, 2012

(86) PCT No.: PCT/EP2012/072023
§ 371 (c)(1),
(2) Date: May 20, 2014

(87) PCT Pub. No.: WO2013/075945
PCT Pub. Date: May 30, 2013

(65) Prior Publication Data
US 2015/0069962 A1    Mar. 12, 2015

(30) Foreign Application Priority Data
Nov. 22, 2011    (DE) .................. 10 2011 086 800

(51) Int. Cl.
*B25H 3/02*  (2006.01)
*H02J 7/00*  (2006.01)
*H02J 50/10*  (2016.01)

(52) U.S. Cl.
CPC .............. *H02J 7/0044* (2013.01); *B25H 3/02* (2013.01); *H02J 50/10* (2016.02); *H02J 7/0052* (2013.01)

(58) Field of Classification Search
CPC .......... B25H 3/00; H02J 7/0044; A45C 11/26; B65D 85/28; B65D 21/025; E05C 17/025
(Continued)

(56) References Cited

U.S. PATENT DOCUMENTS 5,853,092 A * 12/1998 Goodman ................ B25H 3/04
                                                              211/106.01
6,218,796 B1    4/2001 Kozlowski
(Continued)

FOREIGN PATENT DOCUMENTS

CN    2213052 Y    11/1995
CN    1495388 A    5/2004
(Continued)

OTHER PUBLICATIONS

International Search Report for PCT/EP2013/072023, dated Jun. 6, 2013.

*Primary Examiner* — Drew A Dunn
*Assistant Examiner* — Harry O'Neill-Becerril
(74) *Attorney, Agent, or Firm* — Norton Rose Fulbright US LLP; Gerard Messina

(57) ABSTRACT

A hand tool case holding device includes: a holding device housing, a case accommodating area, and at least one charging coil, which is provided for the purpose of transferring energy into the case accommodating area in a direction perpendicular to a charging surface of the holding device housing. The holding device housing has a case support surface, which is provided for the purpose of causing a support force at least essentially parallel to the charging surface.

22 Claims, 5 Drawing Sheets

(58) Field of Classification Search
USPC ...... 206/349, 372, 373; 320/108; 312/107.5,
312/215, 216, 222, 332.1, 333, 244, 245,
312/246, 242; 224/400, 448, 449, 458;
248/200, 207, 220.21, 220.22, 223.31,
248/224.7, 305, 309.1; 220/476, 477,
220/478, 479, 480, 481, 482, 483;
292/11, 26, 48
See application file for complete search history.

(56) References Cited

U.S. PATENT DOCUMENTS

| | | | |
|---|---|---|---|
| 8,575,887 B1* | 11/2013 | Pomare | H02J 7/0044 |
| | | | 136/291 |
| 2009/0212737 A1* | 8/2009 | Johnson | A47B 96/02 |
| | | | 320/108 |
| 2010/0012538 A1* | 1/2010 | Brunner | B25H 3/02 |
| | | | 206/373 |
| 2010/0013432 A1 | 1/2010 | Toya et al. | |
| 2010/0176762 A1* | 7/2010 | Daymude | H02J 7/0027 |
| | | | 320/115 |

FOREIGN PATENT DOCUMENTS

| | | |
|---|---|---|
| CN | 2794932 Y | 7/2006 |
| CN | 201670149 U | 12/2010 |
| CN | 102077304 A | 5/2011 |
| EP | 1 563 965 | 8/2005 |
| KR | 2011 0107728 | 10/2011 |

\* cited by examiner

HAND TOOL CASE HOLDING DEVICE

BACKGROUND OF THE INVENTION

1. Field of the Invention

The present invention relates to a hand tool case holding device.

2. Description of the Related Art

A hand tool case holding device including a holding device housing, a case accommodating area, and at least one charging coil, which is provided for the purpose of transferring energy into the case accommodating area in a direction perpendicular to a charging surface of the holding device housing, has already been provided.

BRIEF SUMMARY OF THE INVENTION

The present invention is directed to a hand tool case holding device including a holding device housing, a case accommodating area, and at least one charging coil, which is provided for the purpose of transferring energy into the case accommodating area in a direction perpendicular to a charging surface of the holding device housing.

It is provided that the holding device housing has a case support surface, which is provided for the purpose of causing a support force at least essentially parallel to the charging surface. A "holding device housing" is to be understood as a unit which, in an operationally ready state, supports a force acting on the case support surface. A part of the holding device housing preferably connects the charging coil, the charging surface, and the case support surface to one another. The holding device housing preferably encloses an interior chamber, in which advantageously a charging electronic system of the hand tool case holding device is situated. The charging surface is advantageously an outer surface of the holding device housing. The case support surface is preferably an outer surface of the holding device housing. A "charging electronic system" is to be understood in particular as an electronic system which controls and/or preferably regulates an energy transfer to the hand tool battery depending on a charge state of the hand tool battery. The hand tool battery preferably requests charging power from the charging electronic system.

A "case accommodating area" is to be understood in particular as an area in which the hand tool case is situated at least during a charging operation. A holding device housing of the hand tool case holding device preferably delimits the case accommodating area on at least one side, and advantageously on a side of the charging surface and in particular on a side of the case support surface. A "charging coil" is to be understood in particular as a coil which receives and/or transmits energy during a charging operation. The charging coil of the hand tool case holding device preferably transmits energy during a charging operation, which a charging coil of a hand tool, which is situated in the case accommodating area, and/or advantageously a hand tool battery receives. The charging coil preferably includes at least one coil winding and in particular a coil core. Alternatively or additionally, the charging coil could be implemented as an air-core coil. The charging coil is preferably implemented as a printed conductor on a circuit board or particularly preferably as a wound coil. "Provided" is to be understood in particular as specially programmed, designed, and/or equipped.

A "charging surface" is to be understood in particular as a surface of the holding device housing, through which the charging coil transfers energy in the direction of the case accommodating area during a charging operation. The charging surface preferably forms a part of an outer side of the holding device housing. A field strength, which transfers the energy, on the charging surface advantageously reaches less than 90% of a maximum field strength, which is incident on a plane spanned by the charging surface. In particular, the charging surface is larger than 1 $cm^2$, advantageously larger than 5 $cm^2$, particularly advantageously larger than 25 $cm^2$. The term "transferred" is to be understood in particular to mean that the charging coil transmits electrical energy with the aid of a magnetic alternating field to the charging coil situated in the case accommodating area. The charging coil situated in the case accommodating area is preferably part of the hand tool case and/or particularly preferably part of a hand tool battery and/or a hand tool situated in the hand tool case.

A "case support surface" is to be understood in particular as a surface which, in at least one operating state, supports a weight force of the hand tool case with the aid of the support force, and in particular if the charging surface is aligned perpendicularly. Furthermore, the case support surface advantageously delimits, in at least one operating state, a movement of the hand tool case in the event of an establishment of a connection to the hand tool case holding device. The case support surface preferably positions the hand tool case, before the establishment of the connection to the hand tool case holding device, in a position provided for establishing the connection. The case support surface is preferably situated spaced apart from the charging surface. The case support surface is preferably aligned at least essentially perpendicularly to the charging surface. In particular, the case support surface is larger than 1 $cm^2$, advantageously larger than 5 $cm^2$, particularly advantageously larger than 25 $cm^2$. In particular, a "support force" is to be understood as a force which is composed of the forces acting from the case support surface on the hand tool case. The support surface preferably causes positioning of the hand tool case. The support force particularly preferably counteracts a weight force of the hand tool case in at least one operating state. In this context, the phrase "at least essentially" is to be understood to mean in particular that an angle between a direction of the transfer of the charging coil and a vertical to the charging surface or a direction of the support force and a plane spanned by the charging surface is less than 45°, advantageously less than 30°, particularly advantageously less than 15°. "Cause" is to be understood in this context in particular to mean that the case support surface exerts a force on the hand tool case in at least one operating state. Particularly stable fixing of a hand tool case in the case accommodating area may be achieved by the embodiment according to the present invention of the hand tool case holding device. Furthermore, particularly comfortable positioning of the hand tool case is possible in a position which is optimum for a charging operation and/or establishing a connection to the hand tool case holding device.

Furthermore, it is provided that the case support surface is aligned essentially perpendicularly to the charging surface, whereby a support force at least essentially parallel to the charging surface may be caused with a simple design.

In addition, it is provided that the holding device housing has a case form-fit surface, which is provided for the purpose of causing a force at least essentially perpendicularly to the charging surface, whereby particularly reliable fastening is possible, in particular for use in a motor vehicle. Alternatively, a case form-fit surface could be omitted in the holding device housing. A "case form-fit surface" is to be understood in particular as a surface which is situated on a side of the case accommodating area opposite to the charging surface. The case form-fit surface is preferably provided for the purpose of causing a force in the direction of the charging surface on the hand tool case.

Furthermore, it is provided that the hand tool case holding device has a holding device implemented separately from the case support surface, which is provided for the purpose of detachably fixing a hand tool case in the case accommodating area of the holding device housing, whereby undesired slipping and/or falling of the hand tool case out of the case accommodating area may be avoided. The phrase "implemented separately" is to be understood in particular to mean that the case support surface and the holding device are situated spaced apart from one another. The holding device is preferably situated on an area of the holding device housing spanned by the charging surface. Alternatively, the holding device could be situated spaced apart from the charging surface and/or could be situated in particular on an area of the holding device housing spanning the case support surface.

Furthermore, a part of the holding device housing could be situated on the area of the holding device housing spanning the charging surface and a part of the holding device could be situated on an area of the holding device housing spanning the case support surface. In particular, an area of the holding device housing spanning the charging surface is provided for the purpose of being connected to a fastening location, for example, a wall. Alternatively, an area of the holding device housing spanning the case support surface could be provided for the purpose of being connected to the fastening location. The case support surface and the holding device preferably act independently of one another on the hand tool case in at least one operating state.

A "holding device" is to be understood in particular as a device which is provided for the purpose of preventing a movement of the hand tool case out of the case accommodating area in at least one operating state. The holding device preferably prevents, in at least one operating state, a movement of the hand tool case independently of a direction of the movement. The holding device preferably holds the hand tool case, at least during a charging operation, in a force-fit manner and/or advantageously in a form-locked manner.

A "hand tool case" is to be understood in particular as a case which, in a closed state, delimits a tool accommodating area in an shock-proof, moisture-proof, and/or dust-proof manner. The hand tool case preferably delimits the tool accommodating area at least partially in the form of a hand tool battery. The hand tool case preferably has at least one positioning and/or fixing means for positioning and/or fixing a hand tool, a hand tool including an attached hand tool battery, and/or particularly preferably a hand tool battery. The hand tool case is preferably magnetically passive and/or advantageously electrically passive. In particular, the hand tool case does not have any electrical equipment. Alternatively or additionally, the hand tool case could have a charging coil and/or advantageously a magnetic field conductor, which receives the energy and relays it in a hard-wired and/or magnetic manner to a hand tool battery. The hand tool case is preferably implemented corresponding to the hand tool case provided in the publication DE 10 2008 058 007 B3, but in particular it has a hand tool accommodating area and/or a hand tool battery accommodating area, which is provided for the purpose of accommodating an inductively charged hand tool battery during a charging operation. In particular, the term "detachable" is to be understood to mean that the holding device fixes the hand tool case in one state and this fixing is separable nondestructively and/or reversibly by an operator in another state.

In one advantageous embodiment of the present invention, it is provided that the holding device has at least one, preferably two holding means, which are provided for the purpose of latching a hand tool case in the case accommodating area, whereby a particularly stable, user-friendly, and in particular automatically closing fastening is possible with a simple design. A "holding means" is to be understood in particular as a means which causes a force to act directly on the tool case in at least one operating state for fixing the tool case. The holding means is preferably implemented as corresponding to a holding means and/or according to a holding means provided in the publication DE 10 2008 058 007 B3. In particular, "latching" is to be understood to mean that a holding means is elastically deflected during a fastening operation of the hand tool case, to subsequently hook behind a corresponding holding means by way of a force acting on the holding means. The elastically deflectable holding means is preferably situated on the hand tool case and the corresponding holding means is situated on the hand tool case holding device.

In another embodiment, it is provided that the holding device has two holding means, which are situated on two opposing sides of the case accommodating area, whereby particularly reliable fixing is possible with a simple design. The phrase "on two opposing sides" is to be understood in particular to mean that the holding means lie on a straight line which intersects the case accommodating area, and which is aligned at least essentially in parallel to one side of the case accommodating area. The holding means, which are provided for the purpose of latching a hand tool case in the case accommodating area, are preferably situated on two opposing sides of the case accommodating area.

Furthermore, it is provided that the two holding means are implemented mirror-symmetrically, whereby an outlay in a design and simple operation are possible. A symmetry plane of the holding means preferably intersects the case accommodating area, in particular in its middle.

Furthermore, it is provided that the holding device is implemented as detachable without tools, whereby a particularly high level of operating comfort may be achieved. The phrase "detachable without tools" is to be understood to mean in particular that a connection of the holding device to the hand tool case is implemented to be detachable manually by an operator. The holding device preferably has at least one operating element, which detaches a fixing of the hand tool case on the holding device in the event of an actuation by an operator.

In addition, it is provided that the charging coil is provided for the purpose of charging a hand tool battery situated in the case accommodating area, whereby, with fixing of the hand tool case in the case accommodating area, the battery may be charged in the hand tool case in particular, in a protected way and with little effort for the operator. A "hand tool battery" is to be understood in particular as a battery which is provided for the purpose of supplying a hand tool with energy. The battery is preferably connected to the hand tool so it is detachable without tools. Alternatively or additionally, a hand tool battery could be integrated into the hand tool. In particular, a "hand tool" is to be understood as a portable tool which appears reasonable to those skilled in the art, but advantageously a drill, a drill hammer, a percussion hammer, a saw, a plane, a screwdriver, a milling machine, a grinder, an angle grinder, a gardening tool, a construction site measuring device, and/or a multifunction tool.

Furthermore, it is provided that the holding device has at least one holding means, which is implemented as part of a form-locked tongue-and-groove connection, whereby stable fixing is possible with a small installation space requirement. A "form-locked tongue-and-groove connection" is to be understood in particular as a connection in which a tongue inserted into a groove experiences a form-fit by way of the groove perpendicularly to a direction of the insertion.

Furthermore, it is provided that the holding device housing has a holding mandrel, which is provided for the purpose of pivotably supporting a hand tool case, whereby particularly precise positioning of the charging coil is possible. A "holding mandrel" is to be understood in particular as a cylindrical area of the holding device housing. The holding mandrel is preferably connected in one piece to a remainder of the holding device housing.

Furthermore, a system including a hand tool case holding device according to the present invention and at least one hand tool case is provided, which has at least one holding device corresponding to the holding device of the hand tool case holding device, whereby the hand tool case holding device is advantageously connectable to various hand tool cases. In this context, "corresponding" is to be understood to mean in particular that the holding device of the hand tool case is provided for the purpose of establishing a detachable mechanical connection to the holding device of the hand tool case holding device.

DETAILED DESCRIPTION OF THE INVENTION

Figure 1:
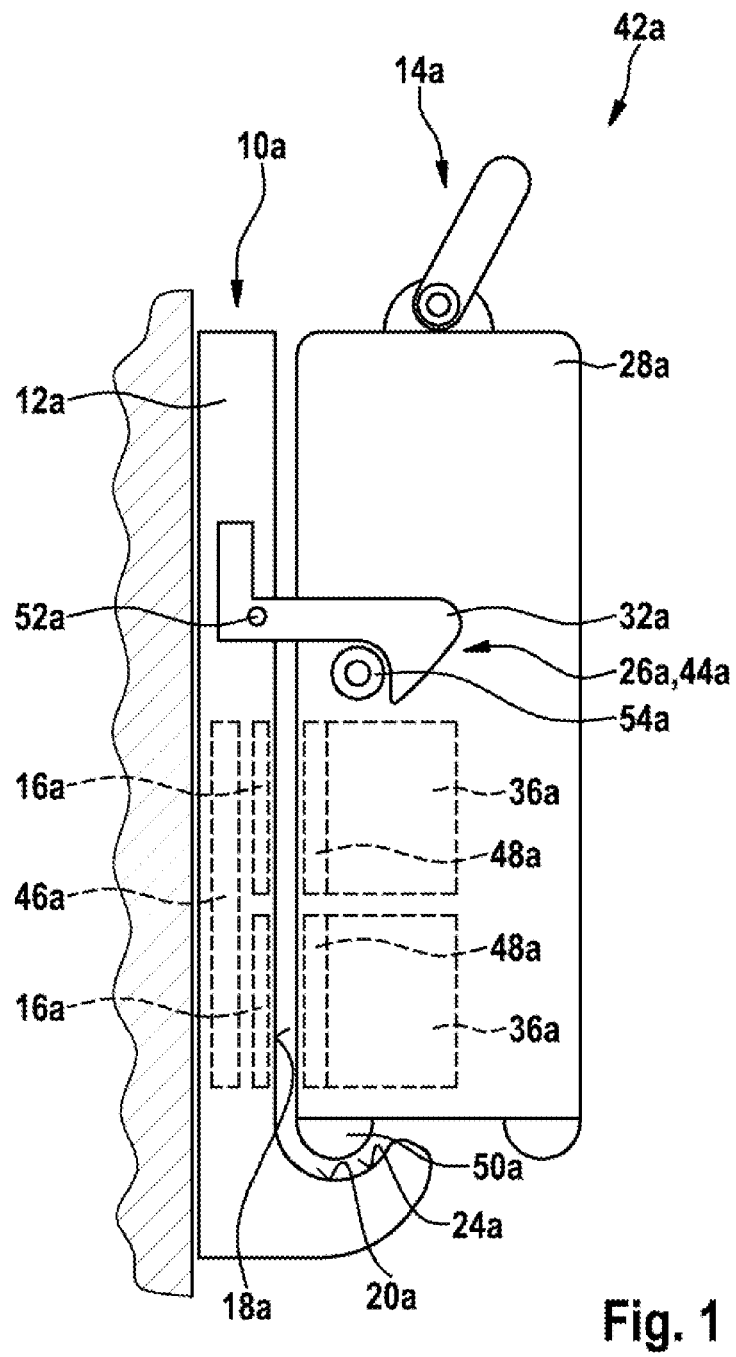
FIG. 1 shows a system according to the present invention including a hand tool case and a hand tool case holding device, which includes a case support surface, which encloses a molded region of the hand tool case.

FIG. 1 shows a system 42a including a hand tool case holding device 10a, a hand tool case 28a, and two hand tool batteries 36a. Hand tool case holding device 10a has a holding device housing 12a, a case accommodating area 14a, two charging coils 16a, a case support surface 20a, a holding device 26a, and a charging electronic system 46a. Holding device 12a connects charging coils 16a, case support surface 20a, and holding device 26a to one another. It has an interior chamber, in which charging electronic system 46a is situated. Hand tool batteries 36a request charging power at charging electronic system 46a during a charging operation. Charging electronic system 46a controls a charging power transferred to hand tool batteries 36a during a charging operation. Holding device housing 12a includes a charging surface 18a, which partially delimits case accommodating area 14a.

Charging coil 16 is provided for the purpose of charging a hand tool battery 36a situated in case accommodating area 14a. Charging coil 16 includes (not shown in greater detail here) a coil winding and a preferably disc-shaped coil core made of ferrite. During a charging operation, the at least one of charging coils 16a transfers the charging energy inductively through charging surface 18a into case accommodating area 14a. Charging coil 16a transfers the energy in a direction perpendicular to charging surface 18a of holding device housing 12a. The two hand tool batteries 36a are situated in hand tool case 28a. Hand tool case 28a fixes hand tool batteries 36a. Hand tool batteries 36a each have a charging coil 48a, which receives the charging energy transmitted from charging coil 16a of hand tool case holding device 10a. Hand tool batteries 36a transmit items of information about their charge state to charging electronic system 46a in a way which appears reasonable to those skilled in the art.

Holding device housing 12a has a case support surface 20a, which is provided for the purpose of causing a support force in parallel to charging surface 18a. Case support surface 20a is implemented in the form of a trough. Case support surface 20a extends parallel to charging surface 18a. It encloses feet 50a of hand tool case 28a, which is fixed by hand tool case holding device 10a. Holding device housing 12a has a case form-fit surface 24a, which is implemented as an area of case support surface 20a facing toward charging surface 18a. Case form-fit surface 24a is provided for the purpose of causing a force at least essentially perpendicularly to charging surface 18a. Case form-fit surface 24a therefore causes a form-fit in a direction perpendicular to charging surface 18a.

Holding device 26a of hand tool case holding device 10a is implemented separately from case support surface 20a. It is provided for the purpose of detachably fixing hand tool case 28a in case accommodating area 14a of holding device housing 12a. For this purpose, holding device 26a includes two holding means 32a, which latch with a holding device 44a of hand tool case 28a to fix hand tool case 28a. Holding means 32a of hand tool case holding device 10a are implemented as engagement hooks, which are connected to holding device housing 12a so they are movable around a pivot axis 52a. Alternatively or additionally, holding means may be displaced in particular using a translational movement for the fixing. Holding means 32a of hand tool case holding device 10a are situated on two opposing sides of case accommodating area 14a. Alternatively or additionally, a holding means could be situated on a handle side of a case accommodating area, which is situated in particular opposite to a case support surface and/or a case form-fit surface. Holding device 44a of hand tool case 28a has two holding means 54a corresponding to holding means 32a of hand tool case holding device 10a. Holding means 54a of hand tool case 28a are implemented as protrusions. Holding device 26a of hand tool case holding device 10a is therefore implemented as detachable without tools. Holding means 32a of hand tool case holding device 10a and holding means 54a of hand tool case 28a are implemented mirror-symmetrically to a plane, which is aligned perpendicularly to charging surface 18a.

During a fixing operation, the operator places hand tool case 28a on case support surface 20a and pivots it in the direction of charging surface 18a. Holding device 26a fixes hand tool case 28a in an illustrated position, in which a case wall of hand tool case 28a is in contact against charging surface 18a.

FIGS. 2 through 7 show four further exemplary embodiments of the present invention. The following descriptions and the drawings are essentially restricted to the differences between the exemplary embodiments, reference also fundamentally being able to be made to the drawings and/or the description of the other exemplary embodiments, in particular of FIG. 1, with respect to identically designated components, in particular with respect to components having identical reference numerals. To differentiate the exemplary embodiments, the letter a is affixed to the reference numerals of the exemplary embodiment in FIG. 1. In the exemplary embodiments of FIGS. 2 through 7, the letter a is replaced by the letters b through e.

Figure 2:
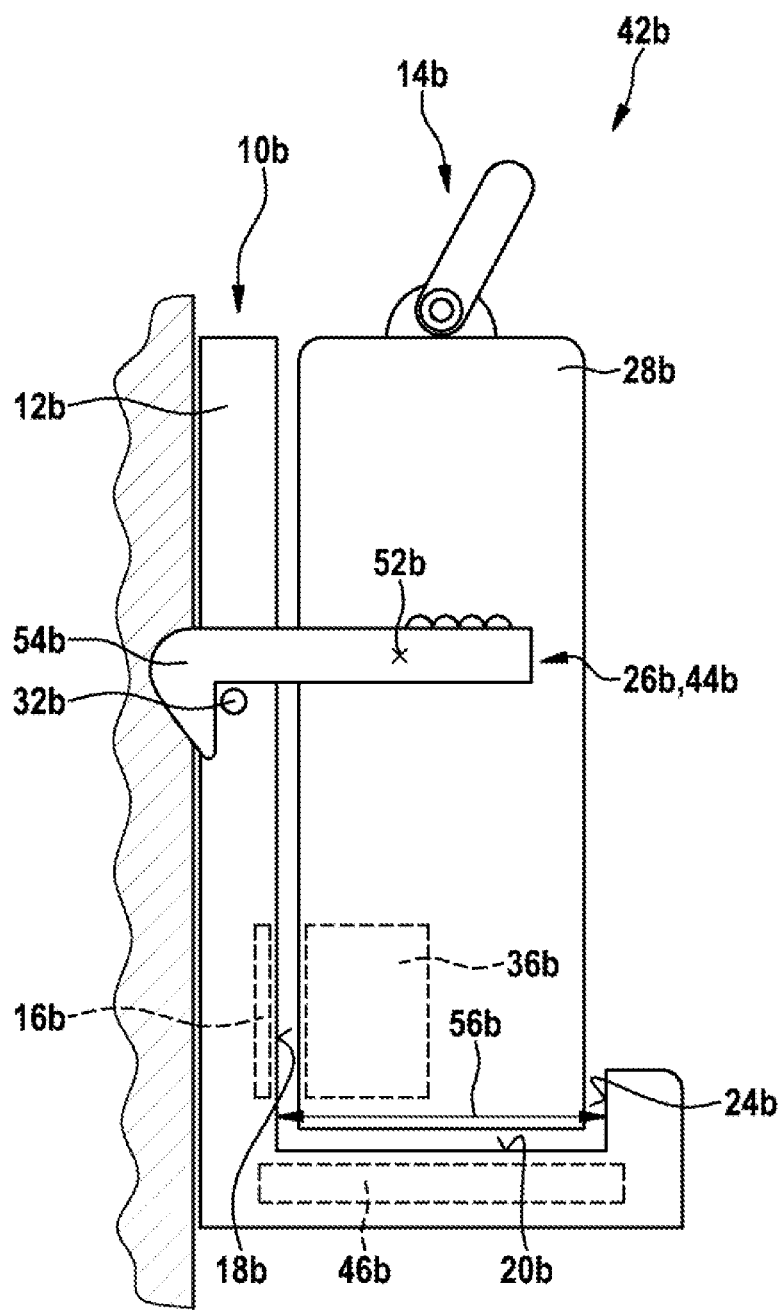
FIG. 2 shows an alternative exemplary embodiment of the system from FIG. 1, a case support surface of a hand tool case holding device enclosing a side wall of the hand tool case.

FIG. 2 shows another exemplary embodiment of a system 42b including a hand tool case holding device 10b, a hand tool case 28b, and a hand tool battery 36b. Hand tool case holding device 10b includes a holding device housing 12b, a case accommodating area 14b, a charging coil 16b, a holding device 26b, and a charging electronic system 46a. Charging coil 16b transfers energy during a charging operation in a direction perpendicular to a charging surface 18b of holding device housing 12b, and specifically into case accommodating area 14b.

Holding device housing 12b has a case support surface 20b, which causes a support force in parallel to charging surface 18b in at least one operating state. Case support surface 20b is aligned perpendicularly to charging surface 18b. It extends over an entire depth 56b of case accommodating area 14b. A case form-fit surface 24b of holding device housing 12b adjoins case support surface 20b on a side of case support surface 20b facing away from charging surface 18b. Charging surface 18b and case support surface 20b are situated on opposing sides of case accommodating area 14b. Charging surface 18b and case support surface 20b are aligned in parallel to one another. Case form-fit surface 24b causes a force perpendicular to charging surface 18b on hand tool case 28b in at least one operating state. Holding means 32b of holding device 26b of hand tool case holding device 10b are implemented as protrusions. Holding means 54b of a holding device 44b of hand tool case 28b are implemented as engagement hooks, which are connected to a remainder of hand tool case 28b so they are movable around a pivot axis 52b.

Figure 3:
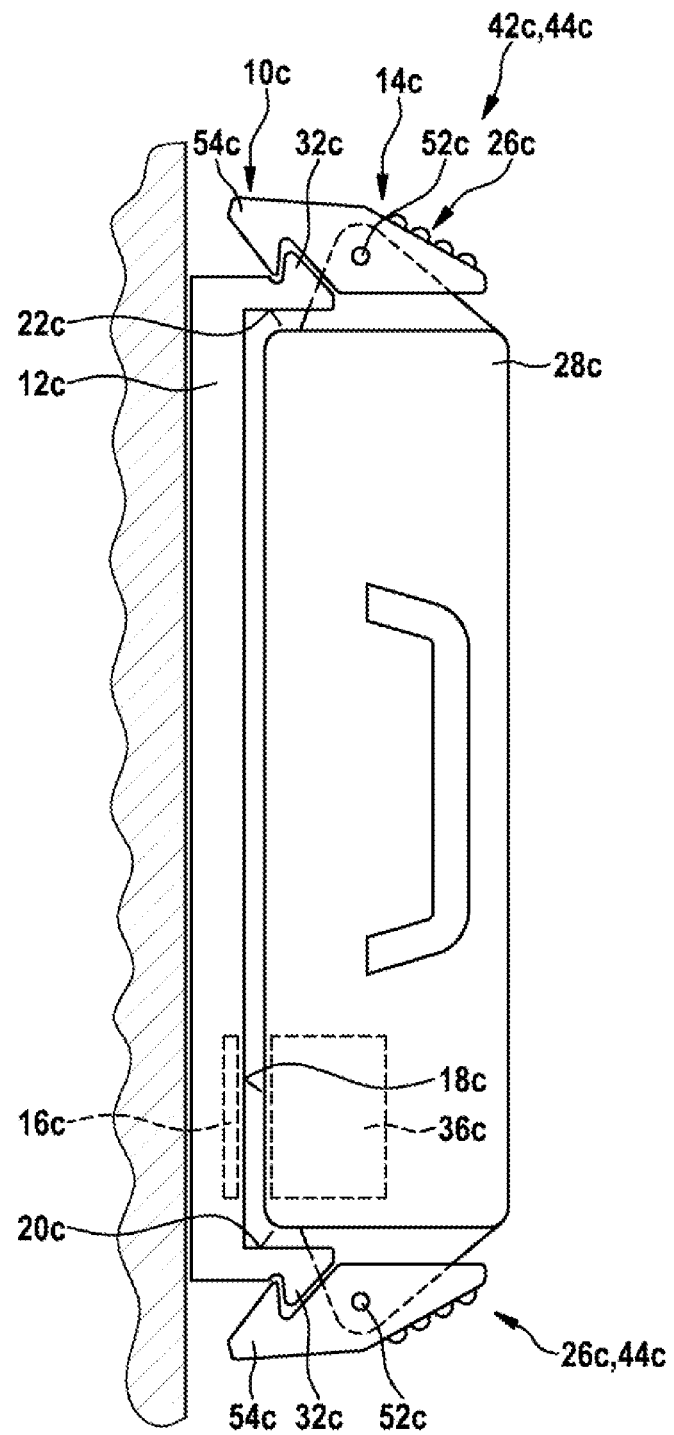
FIG. 3 shows an alternative exemplary embodiment of the system from FIG. 1, a case support surface of a hand tool case holding device being in contact against two side walls of the hand tool case.

FIG. 3 shows another exemplary embodiment of a system 42c including a hand tool case holding device 10c, a hand tool case 28c, and a hand tool battery 36c. Hand tool case holding device 10c includes a holding device housing 12c, a case accommodating area 14c, a charging coil 16c, and a holding device 26c. Charging coil 16c transfers energy during a charging operation in a direction perpendicular to a charging surface 18c of holding device housing 12c, and specifically into case accommodating area 14c.

Holding device housing 12c has two case support surfaces 20c, 22c, which cause a support force parallel to charging surface 18c in at least one operating state. Case support surfaces 20c, 22c are situated on two opposing sides of case accommodating area 14c. Alternatively, a case support surface could in particular completely enclose a case accommodating area on a plane. Holding means 32c of holding device 26c of hand tool case holding device 10c are implemented as protrusions. Holding means 32c of hand tool case holding device 10c are situated on the sides of holding device housing 12c facing away from case support surfaces 20c, 22c. Holding means 54c of a holding device 44c of hand tool case 28c are implemented as engagement hooks, which are connected to a remainder of hand tool case 28c so they are movable around a pivot axis 52c. Holding means 54c of hand tool case 28c latch using a movement in the direction of charging surface 18c.

Figure 4:
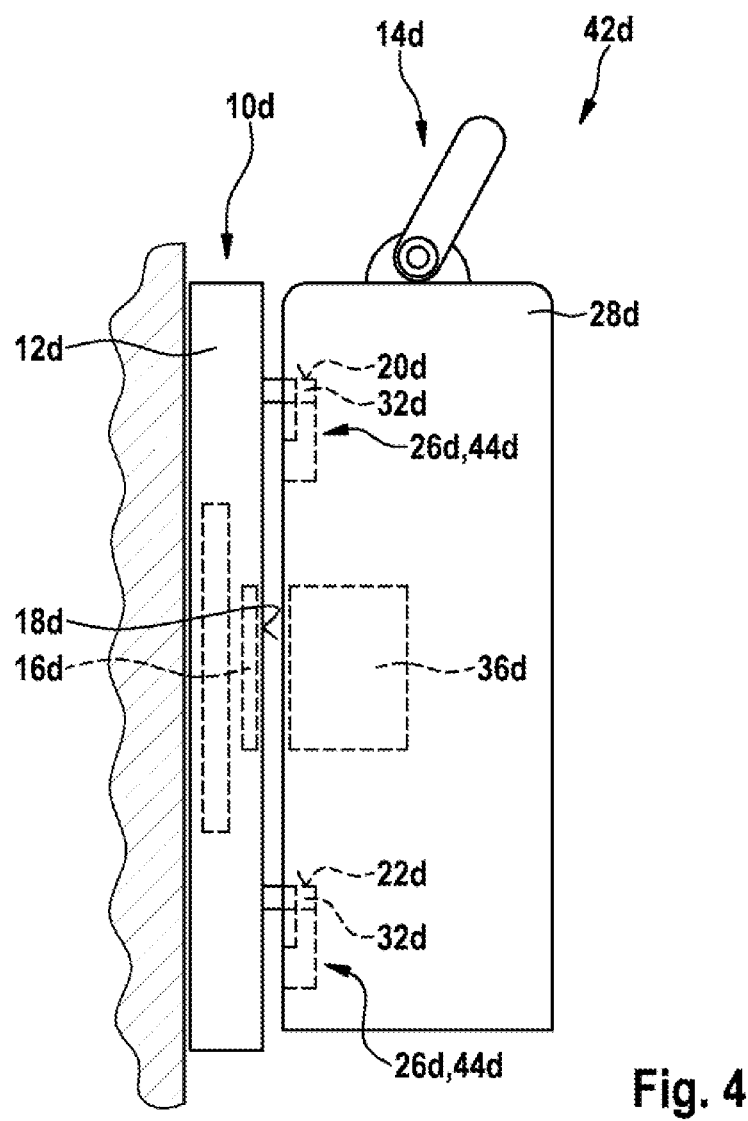
FIG. 4 shows another alternative exemplary embodiment of the system from FIG. 1, the hand tool case and the hand tool case holding device being connected by a form-locked tongue-and-groove connection.

FIG. 4 shows another exemplary embodiment of a system 42d including a hand tool case holding device 10d, a hand tool case 28d, and a hand tool battery 36d. Hand tool case holding device 10d includes a holding device housing 12d, a case accommodating area 14d, a charging coil 16d, and a holding device 26d. Charging coil 16d transfers energy during a charging operation in a direction perpendicular to a charging surface 18d of holding device housing 12d, and specifically into case accommodating area 14d.

Figure 5:
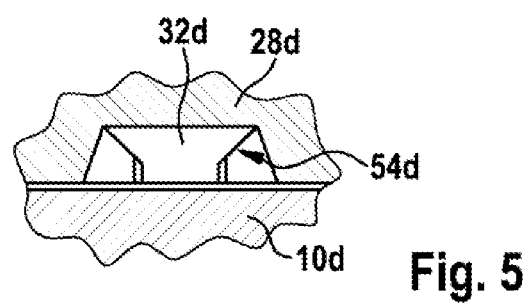
FIG. 5 shows a section through the tongue-and-groove connection from FIG. 4.

Holding means 32d of holding device 26d of hand tool case holding device 10d are implemented as tongues of a form-locked tongue-and-groove connection. FIG. 5 shows a section through the tongue-and-groove connection. The tongue-and-groove connection is implemented as a dovetail connection. Alternatively, the tongue-and-groove connection could be implemented as another connection which appears reasonable to those skilled in the art. Holding means 54d of a holding device 44d of hand tool case 28d are implemented as grooves of the form-locked tongue-and-groove connection. Holding means 32d of hand tool case holding device 10d engage behind holding means 54d of hand tool case 28d in a form-locked manner. Hand tool case 28d is connected to the hand tool case holding device 10d in a form-locked manner and so it is detachable without tools by a movement parallel to charging surface 18d.

Holding device housing 12d has two case support surfaces 20d, 22d, which cause a support force parallel to charging surface 18d in at least one operating state. Case support surfaces 20d, 22d are implemented as end faces of holding means 32d and are situated in the groove in a connected operating state. Case support surfaces 20d, 22d are aligned perpendicularly to a direction, using which hand tool case 28d is fixed.

Figure 6:
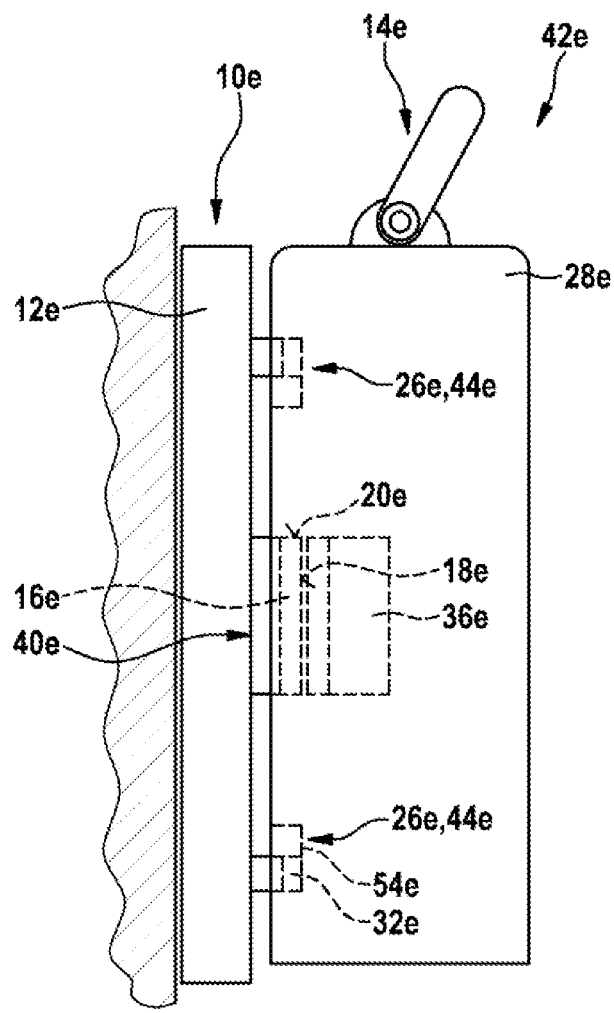
FIG. 6 shows an alternative exemplary embodiment of the system from FIG. 1, a case support surface being situated on a holding mandrel.
Figure 7:
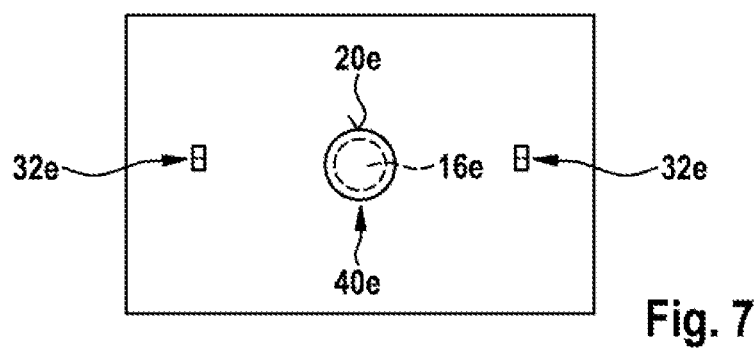
FIG. 7 shows a hand tool case holding device of the system from FIG. 5 in a top view.

FIGS. 6 and 7 show another exemplary embodiment of a system 42e including a hand tool case holding device 10e, a hand tool case 28e, and a hand tool battery 36e. Hand tool case holding device 10e includes a holding device housing 12e, a case accommodating area 14e, a charging coil 16e, and a holding device 26e. Charging coil 16e transfers energy during a charging operation in a direction perpendicular to a charging surface 18e of holding device housing 12e, specifically into case accommodating area 14e.

Holding device housing 12e has a case support surface 20e, which causes a support force parallel to charging surface 18e in at least one operating state. Case support surfaces 20e are situated on a holding mandrel 40e of holding device housing 12e, which is provided for the purpose of pivotably supporting a hand tool case 28e. Case support surface 20e is formed by a lateral surface of holding mandrel 40e. Furthermore, hand tool case holding device 10e has a holding device 26e including two holding means 32e. Holding means 32e are implemented as form-fit hooks. To fix hand tool case 28e, hand tool case 28e is placed on holding mandrel 40e and pivoted on holding mandrel 40e into a fixing position. Holding means 32e of hand tool case holding device 10e engage behind holding means 54e of a holding device 44e of hand tool case 28e, which are implemented as form-fit ribs. Charging coil 16e is situated in holding mandrel 40e. Charging surface 18e is implemented as an end face of holding mandrel 40e.

For the sake of clarity, hand tool case holding devices 10a-e and hand tool case 28a-e are shown spaced apart from one another in FIGS. 1 through 6 at surfaces 18a-e, 20a-e, 22c-d, 24a; 24b, which are in contact against one another in the case of an embodiment according to the present invention when hand tool case 28a-e is fixed by hand tool case holding device 10a-e.

What is claimed is:

1. A hand tool case holding device, comprising:
   a holding device housing;
   a case accommodating area;
   at least one charging coil for transferring energy into the case accommodating area in a direction perpendicular to a charging surface of the holding device housing;
   wherein the holding device housing has two case support surfaces causing a support force at least essentially parallel to the charging surface, wherein the case support surfaces are arranged on two opposing sides of the case accommodating area;
   a holding device which is (i) implemented separately from the case support surfaces, and (ii) provided for the purpose of detachably fixing a hand tool case in the case accommodating area of the holding device housing;
   at least one holding unit provided for the purpose of latching the hand tool case at an external surface of the hand tool case in the case accommodating area, wherein the at least one holding unit is situated on sides of the holding device housing facing away from the case support surfaces,
   wherein the at least one holding unit includes an engagement hook which is connected to the hand tool case such that the at least one holding unit us movable around a pivot axis.

2. The hand tool case holding device as recited in claim 1, wherein the case support surface is aligned essentially perpendicularly to the charging surface.

3. The hand tool case holding device as recited in claim 2, wherein the holding device housing has a case form-fit surface causing a force at least essentially perpendicular to the charging surface.

4. The hand tool case holding device as recited in claim 3, wherein the case form-fit surface is arranged on a side of the case accommodating area opposite to the charging surface.

5. The hand tool case holding device as recited in claim 3, wherein the case form-fit surface is configured to cause a force towards the charging surface.

6. The hand tool case holding device as recited in claim 3, wherein the case form-fit surface is configured to cause a force parallel to the case support surface.

7. The hand tool case holding device as recited in claim 3, wherein the case form-fit surface adjoins the case support surface on a side of the case support surface facing away from the charging surface.

8. The hand tool case holding device as recited in claim 1, wherein the holding device includes the at least one holding unit.

9. The hand tool case holding device as recited in claim 1, wherein the holding device has two holding units situated on two opposing sides of the case accommodating area.

10. The hand tool case holding device as recited in claim 9, wherein the two holding units are implemented as mirror-symmetrical.

11. The hand tool case holding device as recited in claim 1, wherein the holding device is configured to be detachable without tools.

12. The hand tool case holding device as recited in claim 1, wherein the charging coil is provided for the purpose of charging a hand tool battery situated in the case accommodating area.

13. The hand tool case holding device as recited in claim 1, wherein the holding device has at least one holding unit implemented as a part of a form-locked tongue-and-groove connection.

14. The hand tool case holding device as recited in claim 1, wherein the holding device housing has a holding mandrel which is provided for the purpose of pivotably supporting the hand tool case.

15. The hand tool case holding device as recited in claim 1, wherein the charging surface forms an outer surface of the holding device housing.

16. The hand tool case holding device as recited in claim 1, wherein the case support surface forms an outer surface of the holding device housing.

17. The hand tool case holding device as recited in claim 1, wherein the case support surface is aligned substantially perpendicularly to the charging surface and extends over an entire depth of the case accommodating area.

18. The hand tool case holding device as recited in claim 1, wherein the case support surface is formed on a holding mandrel of the holding device housing, the holding mandrel being configured to pivotably support the hand tool case.

19. The hand tool case holding device as recited in claim 18, wherein the case support surface is formed by a lateral surface of the holding mandrel.

20. The hand tool case holding device as recited in claim 1, wherein the at least one holding device includes two holding units which are embodied as latching hooks.

21. The hand tool case holding device as recited in claim 1, wherein the at least one holding device includes two holding units which are embodied as form-fit hooks.

22. A system, comprising:
    a hand tool case holding device including:
       a holding device housing;
       a case accommodating area;
       at least one charging coil for transferring energy into the case accommodating area in a direction perpendicular to a charging surface of the holding device housing, wherein the holding device housing has two case support surfaces causing a support force at least essentially parallel to the charging surface, wherein the case support surfaces are arranged on two opposing sides of the case accommodating area;
       a holding device which is (i) implemented separately from the case support surface, and (ii) provided for the purpose of detachably fixing a hand tool case in the case accommodating area of the holding device housing; and
    a hand tool case which has at least one holding device corresponding to the holding device of the hand tool case; and
    at least one holding unit provided for the purpose of latching the hand tool case at an external surface of the hand tool case in the case accommodating area, wherein the at least one holding unit is situated on sides of the holding device housing facing away from the case support surfaces, wherein the at least one holding unit includes an engagement hook which is connected to the hand tool case such that the at least one holding unit us movable around a pivot axis.

* * * * *